US012665660B2

(12) United States Patent
Sadlocha

(10) Patent No.: US 12,665,660 B2
(45) Date of Patent: Jun. 23, 2026

(54) DNA RNA AVIONICS MODELED ON BIOMIMETICS

(71) Applicant: Keith Gerard Sadlocha, Macomb Township, MI (US)

(72) Inventor: Keith Gerard Sadlocha, Macomb Township, MI (US)

(73) Assignee: Keith Gerard Sadlocha, Macomb Twe, MI (US)

( * ) Notice: Subject to any disclaimer, the term of this patent is extended or adjusted under 35 U.S.C. 154(b) by 694 days.

(21) Appl. No.: 18/100,702

(22) Filed: Jan. 24, 2023

(65) Prior Publication Data

US 2024/0250749 A1 Jul. 25, 2024

(51) Int. Cl.
*H04B 7/185* (2006.01)
*B64C 39/02* (2023.01)

(52) U.S. Cl.
CPC ......... *H04B 7/18504* (2013.01); *B64C 39/02* (2013.01); *H04B 7/18506* (2013.01)

(58) Field of Classification Search
CPC .......... H04W 4/38; H04W 4/70; H04L 67/12; B82Y 10/00
See application file for complete search history.

(56) References Cited

U.S. PATENT DOCUMENTS

| | | | | |
|---|---|---|---|---|
| 11,921,471 B2 * | 3/2024 | Bailey | ..................... | G04G 21/08 |
| 2006/0059497 A1 * | 3/2006 | Leriche | ................... | G06F 9/465 |
| | | | | 719/313 |
| 2020/0348662 A1 * | 11/2020 | Cella | ............... | G05B 19/41865 |
| 2024/0016431 A1 * | 1/2024 | Bitjonck | .............. | A61B 5/0022 |

* cited by examiner

*Primary Examiner* — Khalid W Shaheed
(74) *Attorney, Agent, or Firm* — Keith Gerard Sadlocha

(57) ABSTRACT

The device is a DNARNAAvionics (DRAC) ClamSat platform modeled on Biomimetic, Object Oriented (OO) and Internet of Things (IOT) structures. This platform is for controlling the operational aspects of a nano Satellite termed a ClamSat.
A ClamSat bi-valve shell uses nano hardware and OO software structures to process solar energy in a biomimetic system characterized by energy storage means. It is operationally managed by OO programs in a DNA/RNA messaging format. The Object-oriented programming (OOP) is a method of structuring a program by grouping related property-es and behaviors into individual objects. The ClamSat OO programs are structured in a class, object, and attribute model of OO DNA/RNA strands within modules will provide interfaces within and across components and subsystems and allow for adaptability and reusability over time. The device communicates wirelessly with a Command-and-Control host infrastructure.
The DNA/RNA strand will have Internet of Things (IOT) touchpoints to provide information back to the ClamSat system for Command, Control and Data Handling within the platform.

3 Claims, 6 Drawing Sheets

20    19

| ClamSat DNA Object Class<br><br>Class Name | Present in ClamSat Module | Object and RNA Strand<br><br>ClassName.Function | ClamSat RNA Class Parameter Arguments<br>(Arg1,Arg2,...Arg-1) | Description of Purpose | IOT Touchpoints |
|---|---|---|---|---|---|
| DNA.Propulsion | Propulsion | RNA.Thrust_To_Power_Level | Thrust, PowerLevel | Control Thrust | Instrumentation |
| DNA.Propulsion | Propulsion | RNA.Thrusters | ThrusterIP | Movement | Thruster |
| DNA.Propulsion | Propulsion | RNA.Feed Systems | FeedComponent | Supply Thruster | Feeder |
| DNA.Propulsion | Propulsion | RNA.Propellant Management | Propellant Gauge | Manage Supply | Instrumentation |
| DNA.Propulsion | Propulsion | RNA.Power Processing | CapacitorGauge | Process Supply | Instrumentation |
| DNA.EPS | Electrical Power System (EPS) | RNA.Power Generation | PV1..PV12 | Power Harvesting | Photovoltaic Cell |
| DNA.EPS | Electrical Power System (EPS) | RNA.Power Storage | Battery1..Battery12 | Power Storage | Batteries |
| DNA.EPS | Electrical Power System (EPS) | RNA..Power Distribution | Control1.Device | Power Distribution | PMAD Systems |
| DNA.GNC | Guidance, Navigation and Control | RNA.PositionDetermination | PositionGauge | Position Determination | Instrumentation |
| DNA.GNC | Guidance, Navigation and Control | RNA.AttitudeDetermination | AttitudeGauge | Attitude Determination | Instrumentation |
| DNA.ThermalControl | Thermal Control | RNA.ThermalControl.Heat_Input | HeatInputGauge | Passive Thermal Control | Instrumentation |
| DNA.ThermalControl | Thermal Control | RNA.ThermalControl.Heat_Storage | HeatStorageGauge | Passive Thermal Control | Instrumentation |
| DNA.ThermalControl | Thermal Control | RNA.ThermalControl.Heat_Distribution | HeatDistributionGauge | Passive Thermal Control | Instrumentation |
| DNA.CDH | Command and Data Handling | RNA.CDH.Avionics.OBC | SystemParameters | Integrated, modular onboard-computing | On board computing |
| DNA.CDH | Command and Data Handling | RNA.CDH.Avionics.Processors | SystemParameters | Hardened microprocessor platforms | Radiation hardened processors |
| DNA.CDH | Command and Data Handling | RNA.CDH.Avionics.Memory | MemoryGauge | Compact memory | Memory, Electronic function blocks and components |
| DNA.CDH | Command and Data Handling | RNA.CDH.Avionics.Bus | BusParameters | Used for interfacing with devices and other controllers | Bus Electrical Command and Data interfaces |
| DNA.CDH | Command and Data Handling | RNA.CDH.Avionics.RadMitigation | RadGauge | Protection of components against radiation exposure | Radiation Mitigation and tolerance |
| DNA.FSW | Flight Software | RNA.FSW.Framework | FrameworkParameters | Generic Flight System Architecture Framework | CDH instrumentation |
| DNA.FSW | Flight Software | RNA.OS | OSParameters | Computer system that manages hardware/software resources | CDH instrumentation |
| DNA.FSW | Flight Software | RNA.Software | SoftwareParameters | Computer software that interfaces with the hardware | CDH instrumentation |
| DNA.Telecommunications | Telecommunications | RNA.Uplink | UplinkGauge | Receiving commands (Uplink) | Receiver |
| DNA.Telecommunications | Telecommunications | RNA.Downlink | DownlinkGauge | Transmitting data (downlink) | Transmitter |
| DNA.Telecommunications | Telecommunications | RNA.WiFi | WiFiParameters | Internal device to device communication | WiFi |
| DNA.Telecommunications | Telecommunications | RNA.SmartDevice | SmartDevice OS | Internal SmartDevice network | SmartDevice |
| DNA.Security | Security | RNA.Security | Security Framework | Security Administration | Console |

FIG 4

DNA RNA AVIONICS MODELED ON BIOMIMETICS

CROSS-REFERENCE TO RELATED APPLICATIONS

This device uses an Object Oriented (OO) framework for an avionic system and subsystems architected for ClamSat and SmallSat platforms modeled on biomimetics. A ClamSat shell uses hardware and OO software structures to process solar energy in a biomimetic system characterized by energy storage means. It is operationally managed by OO programs. The Object-oriented programming (OOP) is a method of structuring a program by grouping related properties and behaviors into individual objects. The OO programs are structured in a class, object, and attribute model of OO DNA/RNA strands within modules will provide interfaces within and across components and subsystems and allow for adaptability and reusability over time. The device communicates wirelessly with a Command-and-Control host infrastructure.

CPC

HO2S10/20—Systems characterized by their energy storage means

B64C39/001 Flying saucers

BRIEF SUMMARY OF THE INVENTION

The ClamSat Avionics Platform (CAP) is comprised of the electronics, instruments and functional operations in the platform. The device software is an Object Oriented (OO) framework of DNA/RNA strands with classes and objects within each module.

This device uses a microcontroller powered by onboard supercapacitors to power the CAP and associated subsystems.

This device accomplishes the process of electrical power generation by the movement of neodymium sphericals around a closed orbit to create a voltage for generating electric power for the platform. The captured energy in the system is also stored in lithium-ion batteries for backup. This circular accelerator is optimized with 12 primary induction coils thus increasing the acceleration of the neodymium sphericals in a compact footprint to generate and store the power in supercapacitors.

The microcontroller manages an avionics ring with twelve (12) IP addressable locations for microspray thrusters, switches, and Internet of Things (IOT) communications and telecommunications.

DRAWINGS

These and other features, aspects and advantages of the device are better understood with reference to the following descriptions and accompanying drawing wherein:

FIG. 1 A top view of Ring Coil Accelerator with microcontroller interface

FIG. 2 An expanded view of circuit from IP addressable ring port to microspray thruster FIG. 3 A view of IP addressable ring port for bottom microspray thrusters. The planetary gearing system is also displayed.

FIG. 4 A table of Object Oriented (OO) DNA/RNA strands for ClamSat Modules.

FIG. 5 A Perspective View of OO DNA/RNA strands to IOT devices in ClamSat propulsion module FIG. 6 A Cutaway view of a biomimetic shell integrated with DRAC, Nanomesh and Graphene layers

The planetary gearing system is also displayed.

FIG. 4 A table of Object Oriented (OO) DNA/RNA strands for ClamSat Modules. A high-level summary of ClamSat DNA strand Object classes; modules; Object and RNA strand; ClamSat RNA Class parameter arguments and Internet of Thing (IOT) touchpoints.

Figure 5:
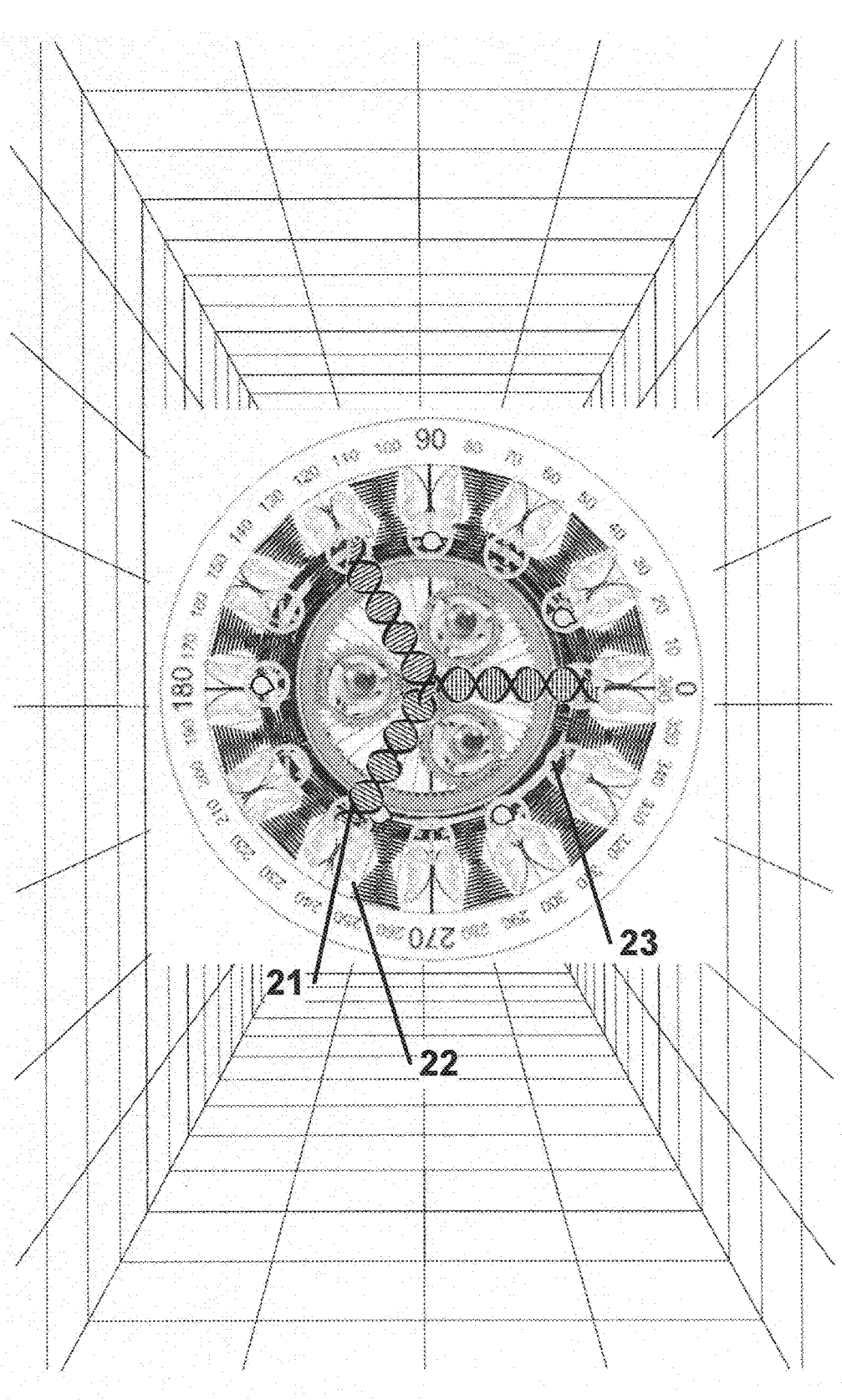

FIG. 5 An example of an OO DNA/RNA strand connecting from the data bus in the Command and Data Handling (CDH) bus to an IOT propulsion device.

Figure 6:
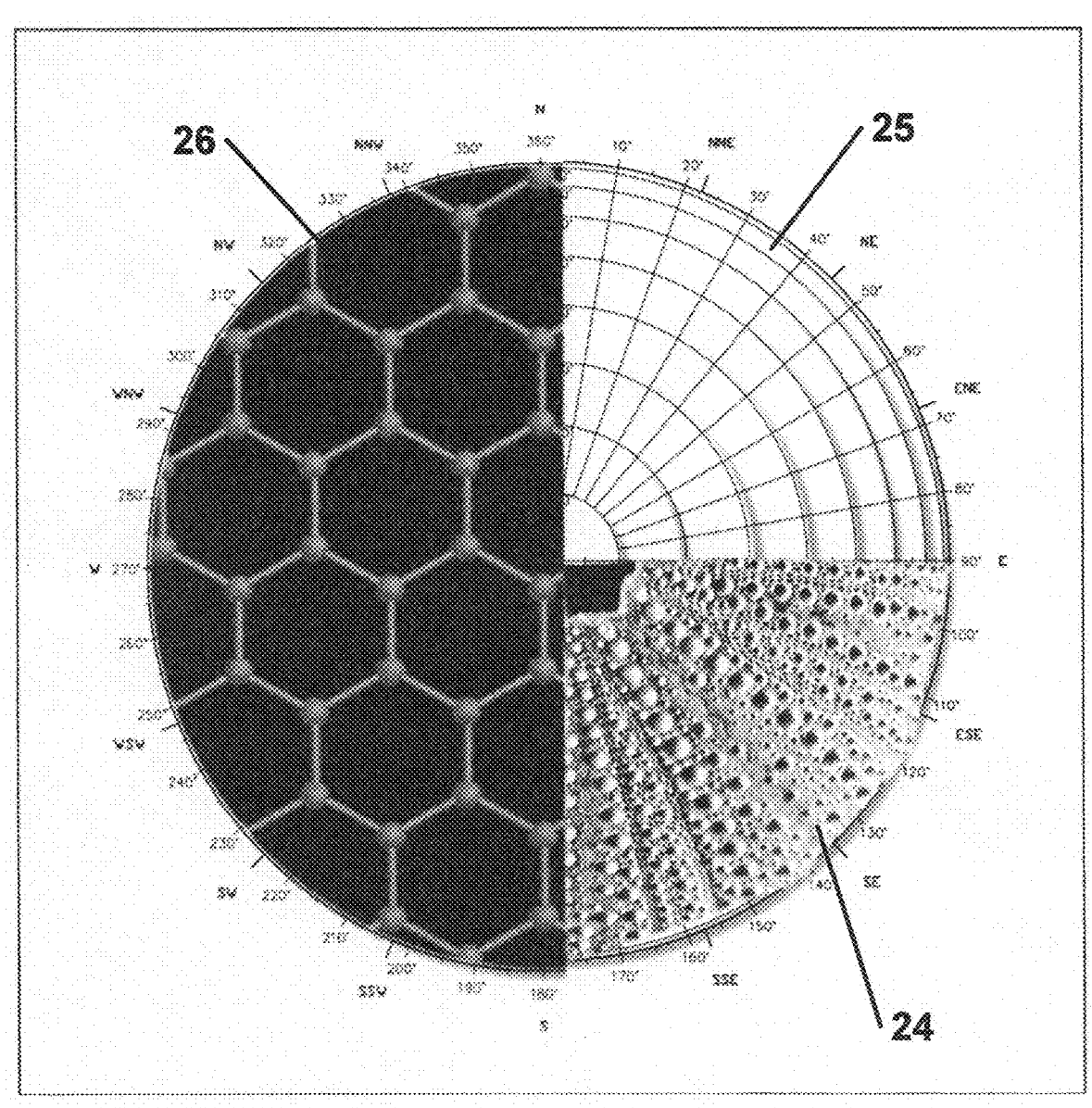

FIG. 6 An example of a biomimetic shell that uses a DRAC to modify the properties of a surface to make it transmedia adaptable.

DESCRIPTION

The preferred embodiments of the present invention are illustrated by method of example below and in FIGS. 1-6. In description of the present invention, it is designed for trans-medium operation in space, aquatic, airspace, terrestrial or extraterrestrial (lunar). It is designed where a light spectrum can be captured, processed, amplified, and stored in accordance with biomimetic principles.

Electrical Power Subsystem (EPS)

Figure 1:
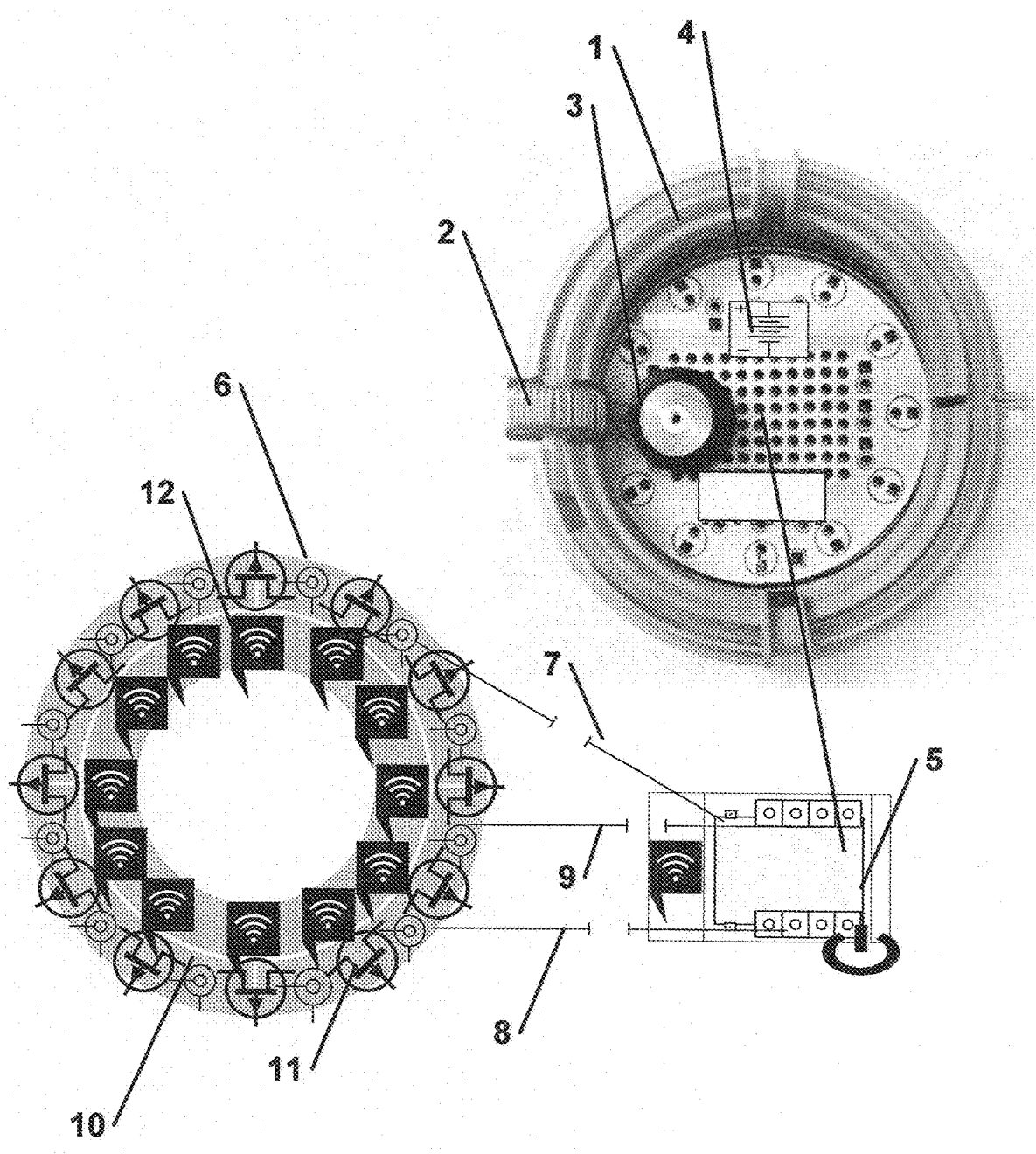
FIG. 1 Ring Coil Accelerator with microcontroller interface to Twelve (12) port Avionics ring FIG. 2 Cutaway view of ring port with circuit to microspray thruster FIG. 3 The view of the microspray thrusters for the bottom on the IP addressable ring port.

FIG. 1 1 shows the device is enclosed with a 12-section ring coil accelerator to generate and store energy from kinetic motion and inductance. Each section has a primary induction coil, a secondary induction coil and an integrated micro spray thruster attached to it via an addressable IP ring. FIG. 1 6

The power generation from the device is a mix of PV, Kinetic and induction power. The EPS system provides electrical power to twelve (12) primary induction coils. The primary induction coils are integrated into the circular accelerator to generate energy from kinetic movement of neodymium sphericals around the track. This kinetic energy is stored in batteries.

An electrical current will flow through each primary coil conductor creating an Electromagnetic Force (EMF) which is termed a Lorenz Force. A Hall Effect sensor FIG on the primary inductor will sense the approach of the spherical and switch the current off and on to accelerate the spherical forward to the primary coil on the track.

The Lorentz force pushes the neodymium sphericals in a direction perpendicular to the conductor and the magnetic field. The current flowing through each of the primary induction coils will also create an EMF and provide mutual inductance FIG. 1 2 to twelve (12) secondary inductance coils FIG. 1 3

Telecommunications

The telecommunications and associated subsystems will be managed by onboard and remote processes using wireless protocols.

Command and Data Handling

Data encryption protocols and authentication will be in place for firmware and software updates.

FIG. 1 5 Shows the microcontroller that communicates to the on-board avionics system and subsystems hardware and software that makes up the avionics control system. It is managed by two microcontrollers communicating wirelessly.

A main microcontroller will use a 433 MHz RF link to transmit and receive data to an onboard microcontroller. The onboard microcontroller will connect to a secure, IP addressable ringlet FIG. 1 6 by a power FIG. 1 7, neutral FIG. 1 8, and ground connections FIG. 1 9.

Propulsion Subsystem

The IP addressable ringlet has a power bus FIG. 1 10 fed by a power supply FIG. 1 4.

Twelve (12) IP addressable ports FIG. 1 11 contain housing sockets for communicating wirelessly FIG. 1 12 to the onboard microcontroller.

Figure 2:
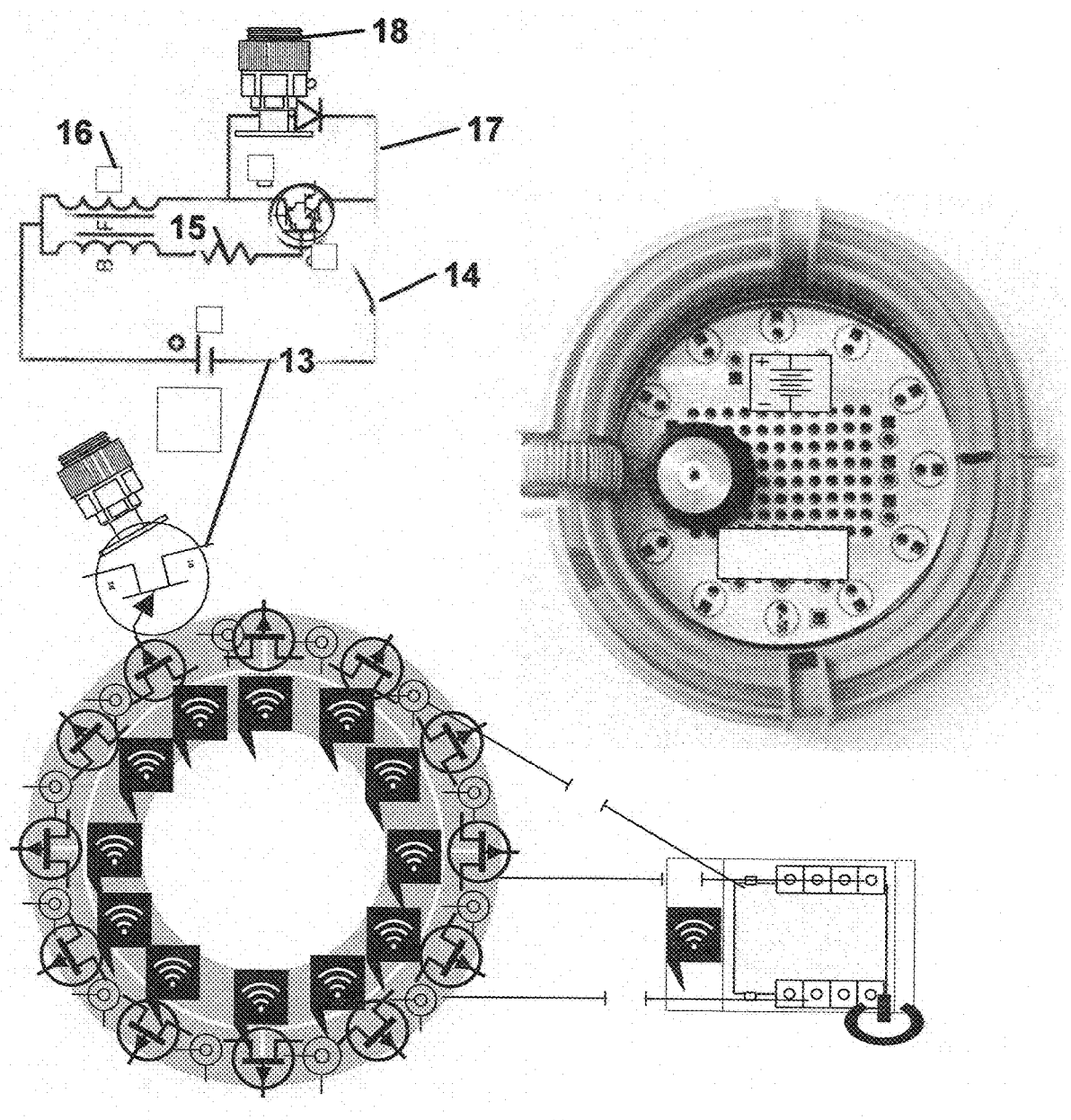

Each housing socket contains a driver switch FIG. 2 that interfaces between the IP addressable ringlet socket and a microspray thruster.

The driver switch connects to an onboard supercapacitor FIG. 2 13 and has an emergency cutoff switch FIG. 2 14. A resistor FIG. 2 15 and Split Ring Resonator (SRR) FIG. 2 16 connected with a diode bridge rectifier FIG. 2 17 connecting to the microspray thruster FIG. 2 18.

Figure 3:
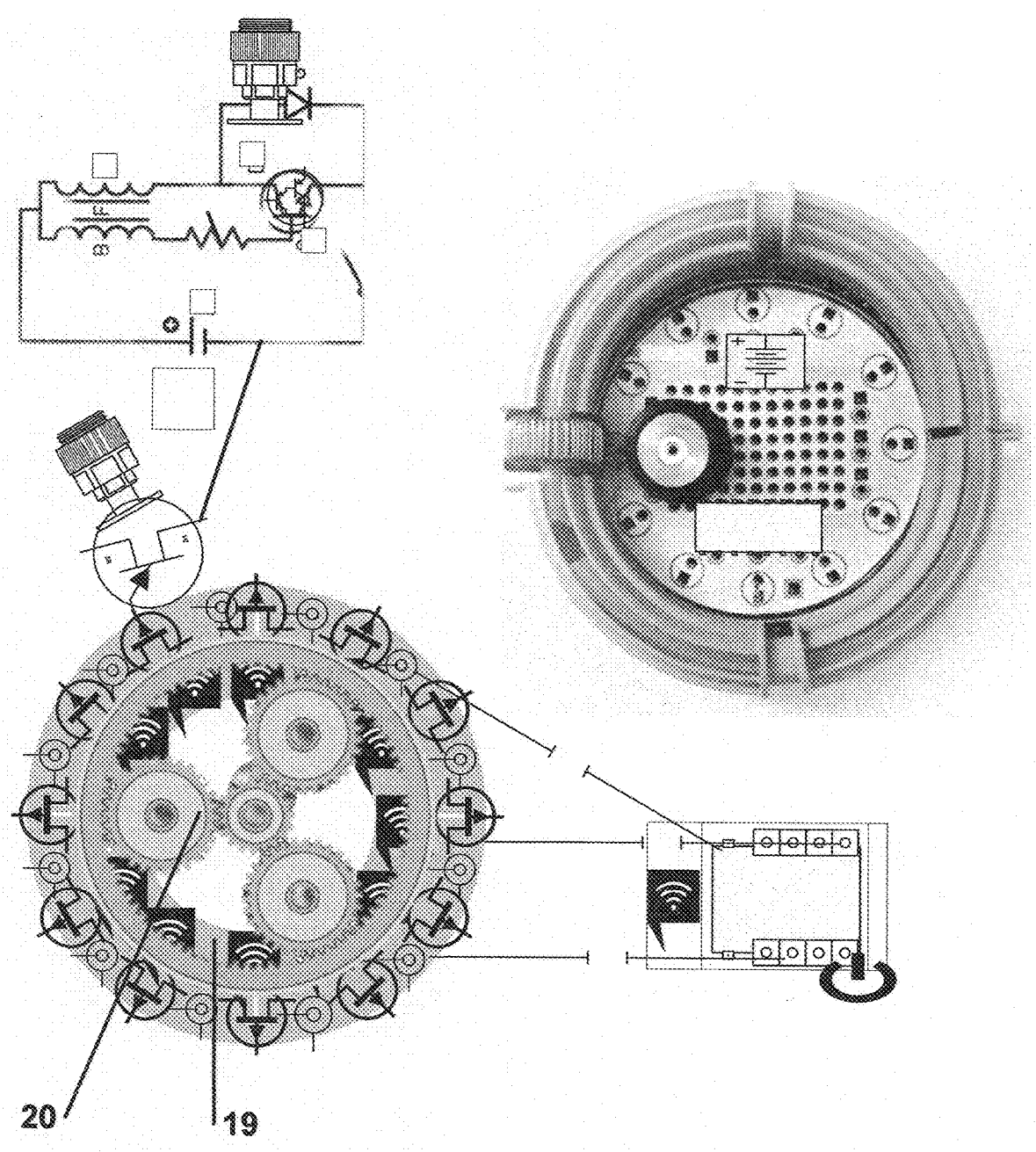

The bottom of the device contains an IP addressable ringlet with twelve (12) addressable ports that contain housing sockets FIG. 3 19 for microspray engines. These housing sockets communicate wirelessly to an onboard microcontroller.

Thermal Control Subsystems

Guidance, Navigation and Control

A planetary gearing system FIG. 3 20 will provide angular momentum for an inner ring on the bottom of the device. This will provide stabilization for the device.

The entire device rotates around its own vertical axis, spinning like a top. This maintains the device orientation in geometric space. The advantage is that it keeps the device pointed in a certain direction.

The operational modules for the ClamSat device are developed in an Object Oriented (OO) DNA/RNA strand framework. This is within the biomimetic design of the ClamSat device. FIG. 4 is a high-level table of the OO DNA/RNA strands by module for the ClamSat device. The DNA Object class is present within a ClamSat module. The class contains RNA strand functions that make the module operational. The RNA strand functions are passed arguments to make a device within the ClamSat perform. The DNA/RNA strand may have Internet of Thing (IOT) touchpoints to provide information back to the ClamSat system. These IOT touchpoints are in the form of sensors and actuators embedded in the CDH systems.

FIG. 5 shows an illustrative example of an OO DNA/RNA strand FIG. 5 21 connecting to an IOT propulsion device FIG. 5 22. The OO DNA/RNA strand communicates to the Command and Data Handling module through a data bus FIG. 5 23.

As encapsuled in FIG. 4 the device DNA/RNA strands will have Internet of Things (IOT) touchpoints to provide information back to the ClamSat system for Command, Control and Data Handling (CDH) within the platform The DNA RNA Avionics platform will work with AI IOT that can learn and adapt to different circumstances. The OO structure provides machine learning and gives components the ability to adapt instead of traditional reprogramming. FIG. 6 the biomimetic modeling of a Sea Urchin Shell with cutaway layers FIG. 6 24, DRAC, FIG. 6 25 Nanomesh layer and FIG. 6 26 Nano Graphene layer. One possibility is the ability for the shell of the device to adapt to water friction when coming out of an airspace environment. A transmedia adaptation by changing the striction at the nano level of white graphene on the bivalve shell. An OO module in the DRAC would modulate the striction with electric current when a change in environment from water to space (non-water) occurs.

The invention claimed is:

1. A satellite avionics system comprising:
an Object Oriented (OO) framework for an avionic system and subsystems architected for ClamSat and Small-Sat platforms modeled on biomimetics, wherein the OO framework is stored on a non-transitory computer-readable medium and executed by a processor to control operational aspects of the ClamSat platform, including processing solar energy in a biomimetic system characterized by energy storage means and hardware structures such as a ring coil accelerator for generating electrical power via kinetic motion of neodymium sphericals.

2. A method comprising: transmitting a biomimetic message utilizing Internet of Things (IoT) touchpoint implemented with sensors and actuators embedded to provide information back to the ClamSat system for Command, Control and Data Handling (CDH) within the platform;
wherein the biomimetic message is part of an Object Oriented (OO) framework structured in a class, object and attribute model; and
wherein the OO framework is stored on a non-transitory computer-readable medium and executed by a processor to enable wireless communication and data encryption for firmware updates.

3. A non-transitory computer-readable storage medium storing a ClamSat avionics Object Oriented (OO) module structured in a class, object, and attribute model of a biometric message within modules that provide interfaces within and across components and subsystems;
wherein the OO module enables modulation of striction with electric current when a change in environment occurs to allow for adaptability and reusability over time; and
wherein the OO module is executed by a processor to manage trans-medium operations in space, aquatic, airspace, terrestrial, or extraterrestrial environments.

* * * * *